United States Patent Office 2,799,896
Patented July 23, 1957

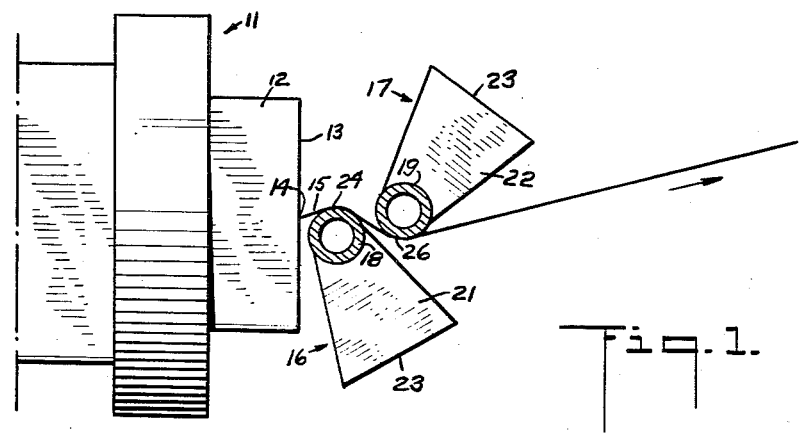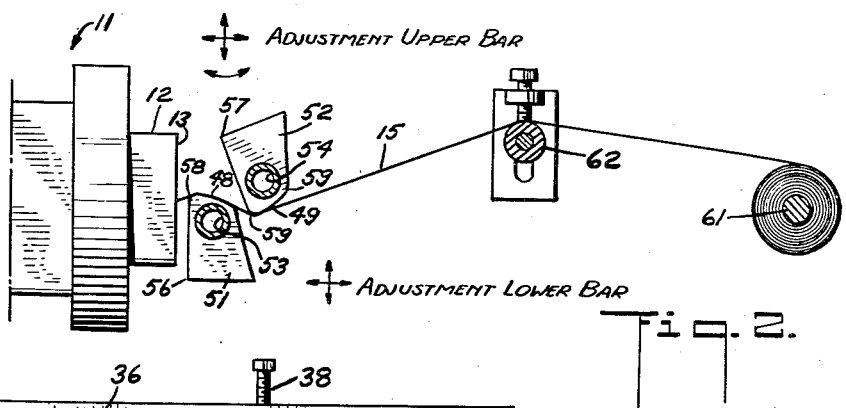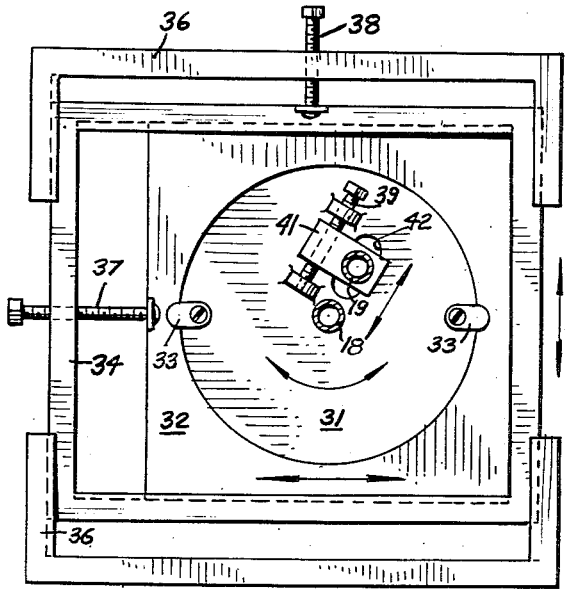

2,799,896
SHEET EXTRUSION APPARATUS

Harold J. Grow, East Orange, and Walter D. Paist, Berkley Heights, N. J., assignors to Celanese Corporation of America, New York, N. Y., a corporation of Delaware Application April 20, 1954, Serial No. 424,360

9 Claims. (Cl. 18—12)

This invention relates to the production of sheet material and relates more particularly to the production of thin sheets, e. g. films, of thermoplastic material by extrusion.

One method which has been commonly employed for the production of films from organic thermoplastic materials has involved extruding said material in heat-softened condition through a die to form a flat sheet or film. The film emerging from the die moves onto the outer surface of a driven, rotating, cooled casting roll or drum, which is driven at a rate such that its outer surface travels at the same speed as the film. The film remains in contact with the cooled casting drum until the temperature of the film is reduced well below its softening point, and is then stripped from the casting drum and wound up on a driven roll, or other take-up mechanism. In one modification a blast of air is blown at the under-surface of the film as it approaches the drum.

In the methods employing the casting drum it is observed that as the film travels from the die to the drum it tends to neck down, i. e. to decrease in width, so that the width of the finished film is considerably less than the width of the extrusion aperture of the die. Also, it is found that the film is much thicker near its edges than in the center portion of the film. Accordingly, in order to obtain a film of substantially uniform thickness it is necessary to cut off a relatively large amount of material adjacent to the edges. The material thus cut off is termed "trim scrap." In addition, when formulations of thermoplastic material containing certain plasticizers are extruded onto the casting drum the plasticizer tends to condense on the surface of the drum and the resulting film has an undesirable mottled or puckered appearance. When the casting drum is wet with such condensed vapors, the film does not release well when stripped from its surface.

The use of casting drums has other disadvantages. Thus, in order to obtain acceptable film the casting drum generally must be relatively large, highly polished and of accurate dimensions. The drum must be driven at a very accurately controlled speed and the speed of the take-up roll must be synchronized with that of the drum, an operation which requires expensive synchronizing equipment. The relatively large drum must be positioned accurately so that it has no tendency to wobble. The temperature of the drum must be closely controlled; in fact, it is often necessary to maintain all portions of the surface of the drum at the same temperature in order to avoid irregularities in the finished film.

It is therefore an object of this invention to provide a novel method and apparatus for the production of films of thermoplastic materials by extrusion, which method and apparatus are free from the foregoing and other defects.

A further object of this invention is to provide a novel, inexpensive and compact apparatus for the production of thermoplastic films by extrusion.

Other objects of this invention will be apparent from the following detailed description and claims.

In accordance with one embodiment of this invention the thermoplastic film emerging from the extrusion die is drawn, by the action of any suitable take-up device, over the surface of a cooled stationary bar mounted adjacent to said die. For best results a pair of cooled stationary bars is used, the bars being so arranged that each bar comes in contact with one face of the film.

The bars employed in this invention are adjustably mounted so that they can be moved relative to each other and relative to the extrusion die, so that the area of contact between the bars and the film can be varied. This adjustable mounting also permits the bars to be moved away from the die to make it easier to start the original extrusion operation or to restart in case of interruption in operation.

In order to insure that the extruded film has good appearance and uniformity of thickness, the bars should be stiff and rigid, so that they are not affected by the normal tension of the film as it passes over them, nor by the vibration of the apparatus, e. g. vibration of the driving mechanism of the extruder. The working faces, i. e. the faces of the bars which come in contact with film, are advantageously uniform throughout their length and are in parallel alignment with the extrusion orifice of the die.

In one embodiment of this invention, the cooling of the bars is accomplished by passing a stream of a cooling fluid through said bars. Suitable cooling fluids are, for example, water, oil, trichloroethylene, brine or ethylene glycol. Each bar may be provided with a single longitudinal passageway for the cooling fluid or there may be a plurality of such passageways. Alternatively, the cooling fluid may be supplied to the passageways in the bars at a plurality of points spaced along the length of each bar. It is desirable to have the passageways for cooling fluid as close as possible to the working faces of the bars.

The working faces of the bars should be maintained at a temperature below that at which the film begins to stick to the surface of said bars. This temperature will depend, of course, on the specific thermoplastic material being extruded. For example, temperatures as high as 70° C. and as low as 15° C. have been found to be suitable for cellulose acetate film. Still lower temperatures, e. g. temperatures as low as those obtained by the use of mixtures of dry ice with suitable liquids, such as alcohol or trichloroethylene, may also be used, if desired.

The bars should be located in close proximity to the extrusion orifice in the die. Thus it is desirable that the film travel a distance of not more than about $1/16''$ to $1/4''$, preferably about $1/8''$ to $3/16''$, from said orifice to the working face of the first bar engaged by said film, the preferred distance being dependent on the extrusion speed. Also, it is desirable that the second bar engage the film directly after it leaves the first bar and that the surface of the film being brought into engagement with said second bar be at a temperature which is at or above its softening point just before it engages the second bar.

It is advantageous to maintain the film of thermoplastic material in contact with the bars until it hardens sufficiently to possess sufficient strength to allow it to be pulled over the bars. For a given rate of extrusion the duration of contact between the film and the bars may be varied readily by adjusting the positions of the bars so as to vary the areas of contact between the film and the bars.

One important feature of this invention involves the use of bars whose working faces have matte surfaces. Thus, while highly polished surfaces will work, it is found that less tension is required to pull the film of thermoplastic material over the bars and a good surface appearance of the film is obtained when said working faces are roughened slightly. For example, the steel bars may be roughened by sand blasting them with grit of 70 to 100 grain size, i. e. of 70 to 100 mesh particle size. After the roughening operation, the working faces may be plated, e. g. hard chromium plated, to make the matte surface harder, more wear-resistant and more corrosion-resistant.

This invention is applicable to the extrusion of organic thermoplastic materials, generally. For example, it may be applied to cellulose derivatives, such as cellulose esters, e. g. cellulose acetate, cellulose propionate, cellulose butyrate, cellulose acetate-propionate, or cellulose acetate-butyrate, and cellulose ethers, such as ethyl cellulose and benzyl cellulose. It may also be applied to such materials as polyethylene, polyvinyl acetals such as polyvinyl formal or polyvinyl acetal, and other vinyl polymers such as polyvinyl chloride, polystyrene and copolymers of vinyl chloride and vinyl acetate.

The draw-down ratio, i. e. the ratio of the take-up speed to the speed of extrusion, may be varied widely in the practice of this invention. For example, we have used successfully draw-down ratios such that the thickness of the final film has ranged from about 0.6 mil to 6 mils when the thickness of the extrusion apertures of the die has been 10 mils.

By the use of this invention smooth uniform films of good appearance may be produced easily with relatively compact and inexpensive equipment. The resulting films have very nearly the same width as the extrusion aperture, i. e. very little necking down takes place. This is extremely important from a practical standpoint since it enables trim scrap losses to be reduced well below 50% of those normally encountered.

In the drawing wherein certain embodiments of this invention are illustrated,

Fig. 1 is a diagrammatic side view of apparatus for carrying out this invention, Fig. 2 is a diagrammatic side view of another form of apparatus, and Fig. 3 is a diagrammatic side view of an adjustable mounting for the bars of Fig. 1.

Like reference numerals indicate like parts throughout the several views of the drawing.

Referring now to the drawing, reference numeral 11 designates one portion of an extruder of conventional construction provided with a heated die 12 in the front face 13 of which is a substantially rectangular, wide, thin orifice 14 through which a heat-softened thermoplastic material is adapted to be extruded in the form of a sheet or film 15 by the action of said extruder. Mounted in close proximity to said front face 13 and arranged to come in contact with said film as it is extruded are a pair of chill bars 16, 17 extending more than the entire width of the die orifice. Each of the chill bars 16, 17 comprises a tube 18, 19 respectively, of suitable heat-conductive material such as copper, connected to a source (not shown) of suitable cool heat-transfer fluid, such as cold water, which travels through the tubes 18, 19. Each tube 18, 19 has fixed securely thereto, as by soldering, a stiffening member 21, 22, respectively, which extends substantially the entire length of each chill bar. This stiffening member is relatively thick in the direction generally perpendicular to the direction of travel of the film of thermoplastic material while the base 23 of the stiffening member is relatively broad, so as to impart a high degree of rigidity to the chill bars. The working faces 24, 26 of the tubes 18, 19, respectively, i. e. the portions of the tubes which are adapted to come in contact with the film of thermoplastic material, are machined so that they are uniform and in parallel alignment with the extrusion orifice along their entire length. These working faces are then finished by sand blasting with grit 70 to 100 grain size to produce a matte finish thereon.

The positions of the chill bars 16, 17 are adjustable with respect to each other and with respect to the film of thermoplastic material. One suitable form of adjusting mechanism is shown diagrammatically in Fig. 3, the various directions in which adjustments can be made being indicated by the arrows in said Fig. 3. This adjusting mechanism comprises a circular plate 31 adapted to support at its center an extension of the lower chill bar tube 18. The circular plate 31 is adjustably mounted in a circular opening of a block 32, clamps 33 being provided for holding said circular plate in its adjusted position in said block. The block 32 is in turn adjustably mounted in a frame 34, itself adjustably mounted in a stationary support 36. Adjusting screws 37 and 38 are provided for setting the horizontal position of the block 32 and the vertical position of the frame 34, respectively. Mounted on the circular plate 31, by means of an adjusting screw 38, is a carriage 41 for supporting an extension of the upper chill bar tube 19, there being a radial slot 42 in said circular plate for receiving said extension. Thus, by rotating the screw 39 the distance between the upper and lower chill bars 16 and 17 may be varied, and by rotating the circular plate 31 the position of the upper chill bar may be varied along a circular path.

In Fig. 2 there is shown another form of chill bar, in which the radius of curvature of the working face 48, 49 of each chill bar 51, 52 is considerably larger than the radius of the passage 53, 54 through which the cooling liquid flows. Thus in one suitable embodiment the radius of curvature of the working faces 48, 49 of the respective chill bars is about 8 times the radius of the passage for cooling liquid and the centers of curvature of said working faces are about at the rear corners 56, 57 of the respective chill bars. Advantageously, the edges 58, 59, where the working faces 48, 49 of the chill bars join the front and rear faces thereof, are slightly rounded, e. g. to a radius of curvature about $\frac{1}{16}$ the radius of curvature of the working face. The lower and upper chill bars 51, 52 are so monted as to be independently adjustable, as shown by the arrows in Fig. 2. Thus, the lower chill bar 51 is adjustable horizontally and vertically while the upper chill bar 52 is adjustable horizontally and vertically and is also adapted to be rotated about.

As shown in Fig. 2, there is provided a driven take-up roll 61, for drawing the extruded film from the die past the chill bars and for winding the film into roll form, and a vertically adjustable idler roll 62, over which the film travels on its way to the take-up roll.

In operation, the film extruded from the die 12 passes directly to the working face 24 or 48 of the lower chill bar 16 or 51, then to the working face 26 or 49 of the upper chill bar 17 or 52, then over the idler roll 62 to the take-up roll 61. The amount of contact between the film and each working face may be varied by suitable adjustment of the positions of the chill bars and, if desired, by adjustment of the position of the idler roll.

In one preferred method of operation, the extruder 11 is so mounted that the film is extruded in a horizontal direction, and the chill bars 16, 17 or 51, 52 and idler roll 62 are so adjusted that the extruded film moves upwardly to the upper portion of the lower chill bar, then downwardly around the lower portion of the upper chill bar, and then upwardly to said idler roll.

At the start of the extrusion operation and when it is necessary to repair breaks in the film the chill bars 16, 17 or 51, 52 are moved away from the face 13 of the die 12, manually or by any suitable mechanism, to permit the extruded film to be threaded properly from said front face to the idler roll 62 and take-up roll 61. Then, when the extrusion is progressing in a satisfactory manner, the chill bars are moved into engagement with the film. Preferably at least one of said chill bars is brought into close proximity to the front face 13 of the die 12 so that the extruded film travels only a short distance, e. g. $\frac{1}{8}''$ to $\frac{5}{16}''$, before it engages the working face of said chill bar. The form of chill bar disclosed in Fig. 2 is particularly adapted to be brought very close to said front face 13.

The following examples are given to illustrate the invention further.

*Example I*

Using an apparatus similar to that shown in Fig. 2, a cellulose acetate composition is extruded at a rate of 58.2 grams per minute in the form of a flat film through a die having a thin orifice 5 inches wide and 10 mils thick. The temperature of the die is 455° F. The chill bars are cooled by oil circulating therethrough, the temperature of the oil entering the bars being 37.4° C. and of the oil leaving the bars being 45.5° C. The oil abstracts heat from the film at the rate of about 25 calories per gram of film. The film is taken up at the rate of 40.6 feet per minute. The resulting film is 4¾ inches wide. It is smooth and even, except for a very narrow thicker bead around the edges.

*Example II*

Using an apparatus similar to that shown in Fig. 2, a cellulose acetate molding composition containing a high content of a volatile plasticizer, i. e. diethyl phthalate, is extruded at the rate of 50 feet per minute in the form of a thin flat film through a die having a thin orifice 5 inches wide and 10 mils thick. The temperature of the die is 425° F. and the temperature of the chill bars is 40° C. The film is 4¾ inches wide and is smooth and even. In contrast, when the method using a casting drum is employed there is a marked tendency for the film to have a puckered or mottled appearance and the film is only 4 inches wide.

*Example III*

Using an apparatus similar to that shown in Fig. 1, a polyvinyl formal composition is extruded in the form of a film through a die having a temperature of about 350° F. The orifice of the die is 10 mils in thickness. The chill bars are maintained at a temperature of about 19° C. by means of cold water and the film is taken up at the rate of 40 feet per minute. There is very little difference between the width of the film and the width of the extrusion orifice. The resulting film is of excellent appearance. No difficulties in operation are observed.

*Example IV*

Example III is repeated except that polyethylene is used in place of polyvinyl formal, the die is maintained at a temperature of 575° F., and the film is taken up at the rate of 10 feet per minute. As in Example III, the die orifice is 10 mils thick. The chill bars are maintained at about 16° C. by means of cold water. The results are substantially the same as those obtained in Example III.

It is to be understood that the foregoing detailed description is given merely by way of illustration and that many variations may be made therein without departing from the spirit of our invention.

Having described our invention, what we desire to secure by Letters Patent is:

1. Apparatus for the production of thermoplastic sheet material, which comprises a die for extruding thermoplastic material in heat-softened condition in the form of a flat sheet, a rigid bar extending transversely of said sheet and providing a stationary surface for engaging said sheet as it leaves said die, said stationary surface being uniform along the width of said sheet and having a matte finish, means for cooling said stationary surface, and means for drawing said flat sheet over said stationary surface.

2. Apparatus as set forth in claim 1 in which said cooling means comprises passages for the transmission of a cooling fluid through said bar.

3. Apparatus for the production of thermoplastic sheet material, which comprises a die for extruding thermoplastic material in heat-softened condition in the form of a flat sheet, means providing a plurality of stationary surfaces for engaging both sides of said sheet as it leaves said die, means for cooling said stationary surfaces, and means for drawing said flat sheet over said stationary surfaces, said stationary surfaces having matte finishes.

4. Apparatus for the production of thermoplastic sheet material, which comprises a die for extruding thermoplastic material in heat-softened condition in the form of a flat sheet, a pair of rigid parallel bars extending transversely of said said sheet and having stationary surfaces for successively engaging opposite sides of said sheet as it leaves said die, means for cooling said stationary surfaces and means for drawing said flat sheet over said stationary surfaces, said stationary surfaces having matte finishes.

5. Apparatus as set forth in claim 4 in which said cooling means comprises passages for the transmission of a cooling fluid through said bars.

6. Apparatus as set forth in claim 4 in which said bars are so mounted that the film changes in direction as it passes over said surfaces.

7. Apparatus as set forth in claim 6 in which said bars are adjustably mounted whereby the areas of contact between said film and said surfaces may be varied by variation in the position of said bars.

8. Apparatus as set forth in claim 7 in which said stationary surfaces are substantially uniform along the width of said sheet and in which said cooling means comprises passages for the transmission of a cooling fluid through said bars, said passages being situated closer to said surfaces than to the opposite sides of said bars.

9. Apparatus for the production of thermoplastic sheet material, which comprises means, including a die, for extruding a thermoplastic material in heat-softened condition in the form of a sheet, means providing a stationary surface positioned adjacent to said die, said stationary surface having a matte finish, means for cooling said surface, and means for drawing the extruded sheet, as said sheet emerges from said die, over said stationary surface.

References Cited in the file of this patent

UNITED STATES PATENTS

| | | |
|---|---|---|
| 1,981,351 | Etzkorn | Nov. 20, 1934 |
| 2,317,447 | Domizi | Apr. 27, 1943 |
| 2,399,422 | Back | Apr. 30, 1946 |
| 2,434,541 | Bierer | Jan. 13, 1948 |
| 2,545,868 | Bailey | Mar. 30, 1951 |